Oct. 18, 1960 J. FITCHETTE 2,957,159
MEASURING DEVICE
Original Filed Feb. 13, 1950
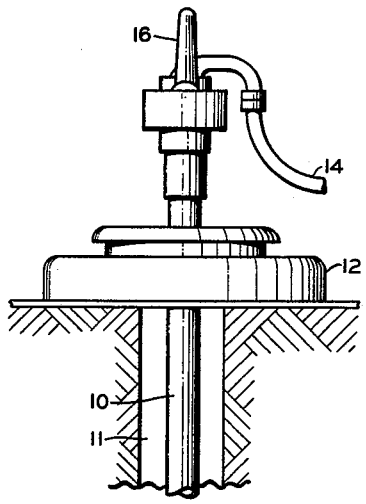
FIG. 1.
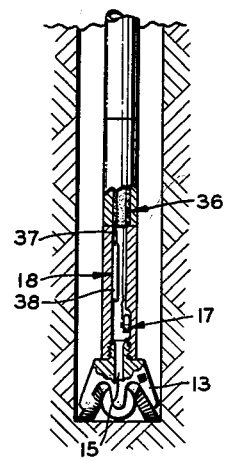
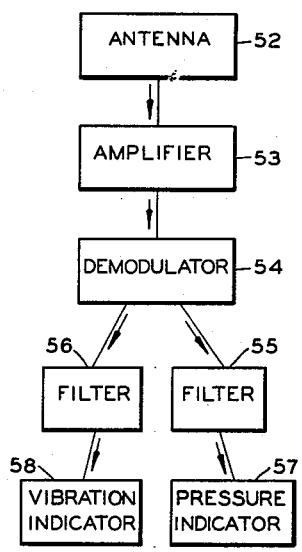
FIG. 4.
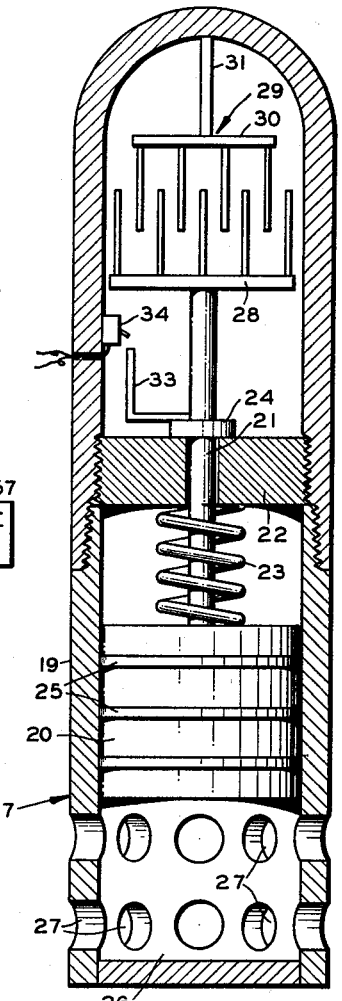
FIG. 2.
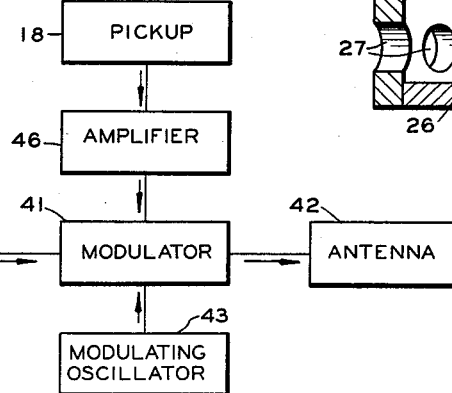
FIG. 3.
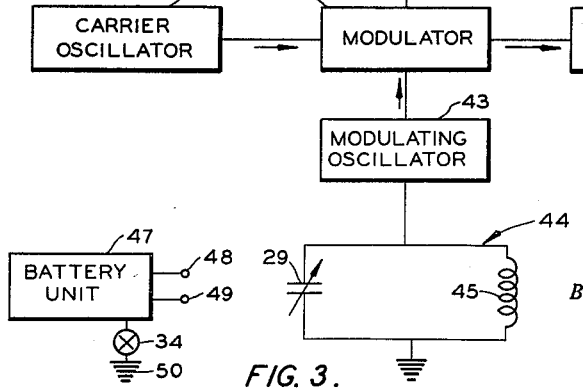
INVENTOR.
JAMES FITCHETTE
BY Hudson & Young
ATTORNEYS

United States Patent Office 2,957,159
Patented Oct. 18, 1960

2,957,159
MEASURING DEVICE

James Fitchette, Bartlesville, Okla., assignor to Phillips Petroleum Company, a corporation of Delaware Continuation of abandoned application Ser. No. 143,922, Feb. 13, 1950. This application Feb. 7, 1955, Ser. No. 486,548

5 Claims. (Cl. 340—18)

This invention relates to a telemetering device for sending valuable information from a drill positioned in a well to the surface of the well. In another aspect it relates to apparatus for measuring vibrations of an element and the pressure adjacent the element. In one specific aspect thereof, it relates to a telemetering device for sending information from a drill to the surface by radio waves.

This application is a continuation of my copending application, Serial No. 143,922, filed February 13, 1950, now abandoned.

Heretofore, it has been difficult or impossible for a well driller to determine the extent of vibration of a drill bit or the pressure in the drilling zone. As the drill bit moves downwardly, it traverses many different types of formations which vary in hardness, liquid or gas content, and other factors. An accurate measurement of the vibration of the drill bit is of great value in aiding the driller to maintain proper adjustment of the drilling apparatus as these different formations are traversed. An accurate measurement of the bottom hole pressure is also of great value to the driller, since a sudden increase in the bottom hole pressure is an indication of an incipient blow out, and possible resulting loss of the well.

It is an object of my invention to provide apparatus for measuring bottom hole pressure and bit vibration, this information being transmitted to surface apparatus by radio waves.

It is a further object to eliminate the use of cumbersome and costly electrical conductors between the surface and the bottom hole apparatus.

It is a further object to transmit a plurality of signals by a common carrier wave, whereby duplication of substantial portions of the transmitter and receiver is avoided.

It is a further object to measure pressure at and vibrations of an element simultaneously.

It is a still further object to provide apparatus which is reliable in operation, rugged, durable, and which utilizes a minimum number of circuit components.

Various other objects, advantages and features of the invention will become apparent from the following detailed description taken in conjunction with the accompanying drawing, in which:

Figure 1 is a vertical sectional view illustrating the manner in which my telemetering apparatus is associated with a drill bit;

Figure 2 is a vertical, sectional view of the pressure-measuring instrument; and Figures 3 and 4 are block diagrams of the transmitter and receiver, respectively.

Referring now to Figure 1, it will be seen that the drilling apparatus includes a string of drill pipe 10 positioned within a drill hole 11 and driven by a rotary table 12. Mounted at the bottom of the tubing string 10 is a drill bit 13, which may be of any well known type. The apparatus is also provided with a mud hose 14 through which mud or other drilling fluid ordinarily enters the top of the drill string 10 and passes downwardly to the bit 13 and, thence, through a passage 15 to the drilling zone. From the drilling zone, the fluid moves upwardly through the annular passage between the drill string and the hole to the surface, from which it passes to the usual mud pit, not shown, and other apparatus conventionally associated therewith. The described mud circulation is referred to as direct circulation. In some cases, particularly when cleaning the well, the mud flows downwardly through the annular passage between drill string 10 and the drill hole and, thence, upwardly through the opening 15 and the interior of drill string 10 to the mud hose 14. It will be understood that the drill string and bit are supported by a cable attached to a swivel 16 which is suspended from a suitable derrick, not shown, and actuated by a suitable hoist.

In accordance with the invention, I provide a pressure-sensing device 17 inside the drill collar adjacent the drill bit, which device converts pressure variations in the drilling zone to impedance changes representative thereof. The downhole apparatus also includes a vibration-sensitive device 18 which is securely mounted to a section of the drill string adjacent the bit 13. The pressure-sensing device, Figure 2, is mounted within a casing 19 having a piston 20 therein for reciprocatory movement by a rod 21 which is slidably mounted by a block 22. A helical spring 23 urges the piston toward a position where a collar 24 on the rod 21 engages the block 22. The piston is provided with sealing rings 25. The lower end of housing 19 defines a chamber 26 having openings 27 therein through which fluid from the well may enter the housing. The upper part of the rod 21 carries the movable element 28 of a variable condenser 29, the stationary element 30 of which is secured to casing 17, as by a rod 31.

It will be evident that the piston 20, rod 21, and movable element 28 all move upwardly when the well pressure exceeds that necessary to raise collar 24 above block 22, thereby producing an increase in capacity of the condenser. Thus, once the pressure increases to a predetermined value, further increases in pressure produce a proportional increase in the capacity of variable condenser 29. During the initial upward movement of piston 20 and rod 21, a lever 33 carried by rod 21 engages the actuator of a switch 34, thereby closing the power supply circuits of a radio transmitter which sends signals to the surface apparatus, these signals being representative of the pressure in the drilling zone.

The vibration-sensitive device 18 may conveniently be a magnetostriction type, such as shown in Eldredge Patent 2,269,760. Such a pickup converts vibrations of the drill string adjacent bit 13 into electrical voltages representative thereof, and these voltages, in accordance with the invention, are utilized to modulate the radio signal produced by the downhole radio transmitter. Of course, any device capable of converting mechanical vibrations into electrical voltages or impedance changes representative thereof may be substituted for the preferred magnetostrictive pickup. The voltages produced by the pickup 18 are passed to a transmitter 36 by leads 37, and the capacitance changes of condenser 29 are fed to the transmitter 36 by leads 38.

The component parts of the transmitter are conventional, although they are combined in a new manner and, hence, the transmitter is represented by a block diagram in Figure 3. It will be understood, however, that the components of the transmitter should be of a physically small size so that the entire transmitter unit may be mounted in the drill string wihout interfering with the mud circulation therethrough. This may be readily accomplished by the use of "midget" tubes, printed circuit components, and batteries of small size. It is also desirable to use a rather high frequency for the radio carrier signal in order to further minimize the size of the circuit components required.

Referring now to the block diagram, Figure 3, it will be seen that the transmitter comprises a high frequency oscillator 40, the output of which is fed through a modulator 41 to an antenna 42. This antenna may conveniently be a short piece of wire mounted vertically within the drill string and surrounded by a covering of insulating material. A modulating oscillator 43, of substantially lower frequency than carrier oscillator 40, has its output fed to the modulator unit 41. This oscillator incorporates a resonant circuit 44 which includes the variable condenser 29 and an inductance 45. Accordingly, changes in capacitance of the condenser 29 responsive to pressure variations in the drilling zone produce corresponding changes in the frequency of the signals produced by oscillator 43. As a result, the carrier signal produced by oscillator 40 is modulated by a low frequency signal, the frequency of which is indicative of the pressure in the drilling zone. The output of the pickup 18 is fed to an amplifier 46, the output of which is, in turn, fed to the modulator 41. The signals produced by the pickup are of a frequency substantially lower than that of the carrier oscillator 40 or that of the modulating oscillator 43. Accordingly, the carrier signal is modulated by both the amplified pickup signals and the signals from the modulating oscillator 43 without interference between these signals. The wave form of the signal produced by pickup 18 is directly related to the vibration of the drilling bit 13 and knowledge of this wave form enables the driller to maintain proper conditions of operation as the bit traverses formations of varied character. The transmitter also includes a battery unit 47, from which leads extend to a plate supply terminal 48, a filament supply terminal 49, and a ground connection 50, the ground lead having the switch 34 connected in circuit therewith. Accordingly, when the well pressure is below a predetermined level, switch 34 is open since lever 33, Figure 2, is out of engagement with the actuator of the switch. As a result, no power is supplied to the transmitter. However, when the pressure rises above such predetermined level as the drill bit approaches the drilling zone, lever 33 closes switch 34 and the power is supplied to the transmitter from the battery unit 47. In this manner, the energy in the batteries is not used up as the drill bit is being raised and lowered within the drill hole.

The signals produced by the downhole transmitter are received at the surface by a receiver, the components of which are of conventional construction, although they are combined in a different manner. Hence, the receiver is shown by a block diagram, Figure 4, from which it will be noted that an antenna 52 picks up the radio frequency signals and passes them to an amplifier 53, from which amplified signals are fed to a demodulator 54. The antenna 52 may consist of a short length of wire positioned at the upper portion of the tubing string, this wire being covered by insulating material. Alternatively, the antenna may be positioned at the surface a short distance from the top of the hole. The demodulator 54 may be of any conventional type and provides an output consisting of the modulating signals impressed upon the carrier wave by oscillator 43 and amplifier 46. In order to separate these signals, the output of the demodulator is fed to two filters 55 and 56, the filter 55 being tuned to the frequency range of the signals generated by modulating oscillator 43, and the filter 56 being tuned selectively to the audio frequency signals produced by pickup 18 and appearing at the output of amplifier 46. The output of filter 55 is fed to an indicator 57 which is responsive to the signals representing the output of modulating oscillator 43, but not to the signals of frequencies produced by pickup 18. This indicator, which may be a cathode ray tube, a frequency meter, or a signal device, thus provides an indication of the pressure existing within the drilling zone. In similar fashion, the output of filter 56 is fed to a vibration indicator 58 which is responsive to the signals appearing at the output of amplifier 46, but not to the signals produced by modulating oscillator 43. Accordingly, the indicator 58, which may be a cathode ray tube, a meter or a signal device, indicates the nature and extent of vibration of the drill bit, and warns the driller when a dangerous amount of vibration is encountered. By observing both indicators, the driller may maintain optimum conditions of bit operation despite wide variations in the nature, hardness and fluid content of the formations traversed by the drill bit.

In some cases, it is desirable to measure the pressure outside the drill collar rather than the pressure inside the drill collar. This may be accomplished by inserting a tube diametrically across the drill collar through suitable openings formed therein, this tube communicating with the chamber 26 by a single large opening, the openings of 27 being omitted. Thus, the exterior pressure is communicated to the sensing device 17. This tube may support the transmitter assembly which may be centralized in the collar by known means. Alternatively, the sensing device may be mounted in a cavity formed in the outer wall of the drill collar.

While the invention has been described in connection with a present, preferred embodiment thereof, it is to be understood that this description is illustrative only and is not intended to limit the invention.

I claim:

1. A drilling unit including a drill string; a drill bit carried by said drill string at the lower end thereof; and a telemetering assembly carried by said drill string adjacent said bit, said assembly including a transducer having a variable impedance for converting pressure changes in the drilling zone into impedance variations representative thereof, a modulating oscillator having said impedance included in a tuning circuit thereof whereby the oscillator frequency varies in accordance with impedance changes produced by said transducer, means for producing a radio frequency carrier wave, means for modulating said carrier wave with the output of said modulating oscillator, a vibration pickup for converting vibrations of said drill bit into electrical voltages representative thereof, and means for modulating said radio frequency carrier wave with said voltages.

2. A drilling unit including a drill string; a drill bit carried by said drill string at the lower end thereof; a telemetering assembly carried by said drill string adjacent said bit, said assembly including a transducer having a variable impedance for converting pressure changes in the drilling zone into impedance variations representative thereof, a modulating oscillator having said impedance included in a tuning circuit thereof whereby the oscillator frequency varies in accordance with impedance changes, means for producing a radio frequency carrier wave, means for modulating said carrier wave with the output of said modulating oscillator, a vibration pickup for converting vibrations of said drill bit into electrical voltages representative thereof, means for modulating said radio frequency carrier wave with said voltages; and a receiver mounted at the surface of the drill hole for demodulating said radio frequency carrier voltage, said receiver including a first filter responsive to demodulated signals of the frequency range produced by said modulated oscillator, an indicator fed by said first filter, a second filter responsive to said demodulated signal and selectively tuned to the frequency of the voltages produced by said vibration-responsive pickup, and a second indicator fed by said second filter.

3. A drilling unit including a drill string; a drill bit carried by said drill string at the lower end thereof; and a telemetering assembly carried by said drill string adjacent said bit, said assembly including an oscillator for producing a radio frequency carrier wave, a modulating oscillator for modulating said carrier wave, a tuned circuit including a variable condenser and an inductance for determining the frequency of said modulating oscillator, a casing secured to said drill string in the region of said bit, said condenser including a stationary element secured to said casing and a movable element, a piston secured to said movable element and mounted for longitudinal movement within said casing, a spring biasing said piston in one direction, means for admitting fluid from said well into contact with said piston to cause movement thereof in the opposite direction, thereby to change the capacitance of said condenser, a vibration pickup mounted on said drill string adjacent said bit, said pickup producing an electrical voltage representative of the vibration of said drill bit, and means for modulating said radio frequency carrier voltage with said electrical voltage.

4. A drilling unit including a drill string; a drill bit carried by said drill string at the lower end thereof; and a telemetering assembly carried by said drill string adjacent said bit, said assembly including an oscillator for producing a radio frequency carrier wave, a modulating oscillator for modulating said carrier wave, a tuned circuit including a variable condenser and an inductance for determining the frequency of said modulating oscillator, a casing secured to said drill string in the region of said bit, said condenser including a stationary element secured to said casing and a movable element, a piston secured to said movable element and mounted for longitudinal movement within said casing, a spring biasing said piston in one direction, means for admitting fluid from said well into contact with said piston to cause movement thereof in the opposite direction, thereby to change the capacitance of said condenser, a vibration pickup producing an electrical voltage representative of the vibration of said drill bit, means for modulating said radio frequency carrier voltage with said electrical voltage, a battery unit for supplying power to said oscillators and said pickup, a switch for actuating said battery unit, said switch being mounted in said casing, and a lever movable with said piston to close said switch after travel of said piston a predetermined distance against the force of said biasing spring.

5. A drilling unit including a drill string; a drill bit carried by said drill string at the lower end thereof; a telemetering assembly carried by said drill string adjacent said bit, said assembly including an oscillator for producing a radio frequency carrier wave, a modulating oscillator for modulating said carrier wave, a tuned circuit including a variable condenser and an inductance for determining the frequency of said modulating oscillator, a casing secured to said drill string in the region of said bit, said condenser including a stationary element secured to said casing and a movable element, a piston secured to said movable element and mounted for longitudinal movement within said casing, a spring biasing said piston in one direction, means for admitting fluid from said well into contact with said piston to cause movement thereof in the opposite direction, thereby to change the capacitance of said condenser, a vibration pickup producing an electrical voltage representative of the vibration of said drill bit, means for modulating said radio frequency carrier voltage with said electrical voltage, a battery unit for supplying power to said oscillators and said pickup, a switch for actuating said battery unit, said switch being mounted in said casing, a lever movable with said piston to close said switch after travel of said piston a predetermined distance against the force of said biasing spring; and a receiver mounted at the surface of the drill hole for demodulating said radio frequency carrier voltage, said receiver including a first filter responsive to demodulated signals of the frequency range produced by said modulated oscillator, an indicator fed by said first filter, a second filter responsive to said demodulated signal and selectively tuned to the frequency of the voltages produced by said vibration-responsive pickup, and a second indicator fed by said second filter.

References Cited in the file of this patent

UNITED STATES PATENTS

| | | |
|---|---|---|
| 1,666,461 | Lord | Apr. 17, 1928 |
| 2,098,307 | Purington | Nov. 9, 1937 |
| 2,103,847 | Hansell | Dec. 28, 1937 |
| 2,225,668 | Subkow | Dec. 24, 1940 |
| 2,233,183 | Roder | Feb. 25, 1941 |
| 2,379,996 | Silverman | July 10, 1945 |
| 2,404,062 | Hammond | July 16, 1946 |
| 2,436,834 | Stodola | Mar. 2, 1948 |
| 2,507,351 | Scherbatskoy | May 9, 1950 |
| 2,547,876 | Krasnow | Apr. 3, 1951 |
| 2,564,928 | Schmidt | Aug. 21, 1951 |
| 2,586,745 | Tullos | Feb. 19, 1952 |
| 2,596,531 | Clarke | May 13, 1952 |
| 2,609,438 | Winterhalter | Sept. 2, 1952 |
| 2,810,546 | Eaton | Oct. 22, 1957 |